United States Patent [19]
Grosspietsch et al.

[11] Patent Number: 5,704,462
[45] Date of Patent: Jan. 6, 1998

[54] CYLINDER FOR HYDRAULICALLY OPERATED CLUTCHES AND BRAKES AND HYDRAULICALLY OPERATED CLUTCH ASSEMBLIES FOR MOTOR VEHICLES

[75] Inventors: Wolfgang Grosspietsch, Schweinfurt; Alfred Eusemann, Bergrheinfeld, both of Germany

[73] Assignee: Fichtel & Sachs AG, Schweinfurt, Germany

[21] Appl. No.: 561,288

[22] Filed: Nov. 21, 1995

[30] Foreign Application Priority Data

Nov. 23, 1994 [DE] Germany ............... 44 41 438.2
May 4, 1995 [DE] Germany ............... 195 16 391.5

[51] Int. Cl.⁶ ............... F16D 25/02; F16D 25/08
[52] U.S. Cl. ............... 192/85 C; 92/62; 192/91 R
[58] Field of Search ............... 192/85 C, 85 R, 192/91 R; 92/62

[56] References Cited

U.S. PATENT DOCUMENTS

| | | | |
|---|---|---|---|
| 3,786,903 | 1/1974 | Haga et al. | 192/91 R |
| 5,002,169 | 3/1991 | Barker | 192/85 C |
| 5,009,209 | 4/1991 | Seegers | 192/85 C |
| 5,127,506 | 7/1992 | Muller et al. | 192/85 C |

FOREIGN PATENT DOCUMENTS

| | | |
|---|---|---|
| 4212107 | 10/1993 | Germany. |
| 1065599 | 4/1967 | United Kingdom. |
| 1120068 | 7/1968 | United Kingdom. |
| 2086477 | 5/1982 | United Kingdom. |
| 2222213 | 2/1990 | United Kingdom. |
| 2281942 | 3/1995 | United Kingdom. |

*Primary Examiner*—Andrea L. Pitts
*Attorney, Agent, or Firm*—Nils H. Ljungman and Associates

[57] ABSTRACT

A cylinder for hydraulic systems, in particular for motor vehicles, includes a housing with an axial boring, in which a piston fastened to a piston rod is displaced axially in a guided manner, and one end surface of which is pressurized with hydraulic fluid, and which is guided in a sealed manner with respect to the housing. The cylinder is provided with connections for at least one pressure line, a connection to a fluid chamber and for fastening, and at least one lip seal, which lip seal is located in the housing to seal the housing with respect to the exterior surface of the piston. The piston and/or the piston rod, between the hydraulic fluid and the terminal area of the piston rod farther from the piston, is provided with a device for damping pressure surges from the hydraulic fluid. These cylinders are preferably used in hydraulically operated clutch assemblies for motor vehicles and alternatively for braking systems in motor vehicles.

4 Claims, 9 Drawing Sheets

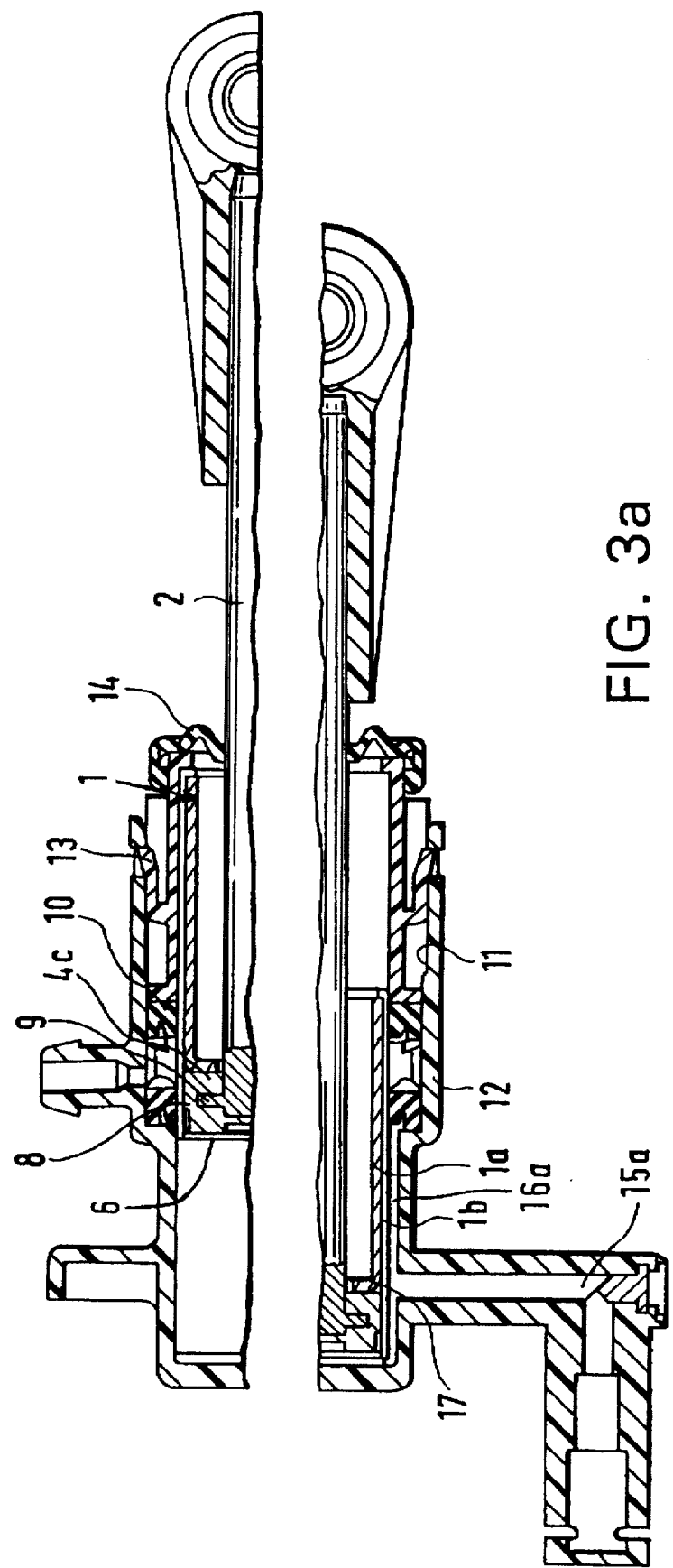

CYLINDER FOR HYDRAULICALLY OPERATED CLUTCHES AND BRAKES AND HYDRAULICALLY OPERATED CLUTCH ASSEMBLIES FOR MOTOR VEHICLES

BACKGROUND OF THE INVENTION

1. Field of the Invention

The present invention generally relates to a cylinder for hydraulic systems, in particular, for motor vehicles, such as hydraulically operated clutches and brakes and the hydraulically operated clutch assemblies for motor vehicles with such cylinders as a part thereof. The cylinder includes a housing with an axial boring, in which housing a piston fastened to a piston rod is displaced axially in a guided manner. One end surface of the piston is pressurized with hydraulic fluid, and the piston is guided in a sealed manner with respect to the housing. The cylinder is provided with connections for at least one pressure line, that is, a connection to a fluid chamber and a connection for fastening. The cylinder further includes at least one lip seal located in the housing, to thereby seal the housing with respect to the exterior surface of the piston.

2. Background Information

There are conventional cylinders for hydraulic systems (e.g. German Laid Open Patent Application No. 42 12 107), which are used for hydraulically actuated clutch or brake systems in motor vehicles. The object of these known systems is to employ simple means to achieve a reverse limit stop which is economical and easy to install. For this purpose, the piston rod balls and the piston are enclosed by two hemispheres. After the assembly of the piston shaft sleeve, the piston and the two hemispheres are inseparably connected to one another. On account of the design of the undercutting on the piston, and on account of the knobs on the two hemispheres, the connection between the piston rod ball and the piston pan is made without play during the installation of the assembly into the piston shaft sleeve. One disadvantage of this configuration is that when the connection between the piston rod and the piston does not incorporate any play, pressure surges or vibrations which result from the hydraulic fluid are transmitted directly via the piston to the piston rod and to the actuator elements.

OBJECT OF THE INVENTION

The object of the present invention is to create a cylinder for hydraulic systems so that the actuator elements can be isolated from vibrations or pressure surges in the hydraulic fluid.

SUMMARY OF THE INVENTION

The present invention teaches that this object can be accomplished if the piston and/or the piston rod, between the hydraulic fluid and the terminal area of the piston rod farther from the piston, is provided with a device to damp pressure surges from the hydraulic fluid.

In accordance with one embodiment, the transmission path, from the actuator elements to the hydraulic fluid to the elements to be actuated, can advantageously include a device, which device can damp vibrations, oscillations or pressure surges. Otherwise, such vibrations, oscillations or pressure surges could travel from the vehicle or vehicle engine to the actuator elements actuated by the operator.

The present invention also teaches that the device can include an elastic suspension, which elastic suspension can be located between the piston rod and the piston.

In one embodiment, the device can be a flexible fastening between the piston and the piston rod.

If the piston is formed in two parts, e.g. when a steel sleeve surrounds a plastic core, the present invention teaches that when a piston is used including an inner part and an outer part, the device can be located between the inner part and the outer part.

In one embodiment of the present invention which can be relatively simple regarding manufacturing, the piston can include a pot-shaped outer part and an inner part. In addition, there can be at least one end surface of the inner part and/or of the base of the pot-shaped outer part, which end surface can be provided with raised portions and/or depressions. The raised portions can advantageously be made of elastically deformable material.

In an additional embodiment, a pot-shaped piston can be provided in the terminal area of the piston, which pot-shaped piston can include a ring-shaped, elastic suspension. The ring-shaped, elastic suspension can be provided with recesses, whereby a corresponding extension of the piston rod can essentially guarantee that the extension can button into the recesses.

The present invention teaches that the device can be assembled relatively easily if at least one lip seal is located in an axial hole essentially without any undercutting of the housing, and the lip seal can be axially held in place by means of a fixing element, which fixing element can be located within the housing. The fixing element can advantageously carry a wiper ring, which wiper ring can be engaged with the piston rod.

In one embodiment which is relatively economical to manufacture, the piston can be realized in a pot shape.

When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

One aspect of the present invention resides broadly in a hydraulically operated clutch assembly for a motor vehicle, the clutch assembly comprising: a flywheel defining an axis of rotation and an axial direction parallel to the axis of rotation; a clutch disc; a pressure plate for applying an axially directed force to the clutch disc, with respect to the axis of rotation of the flywheel, to engage the clutch disc with the flywheel; the clutch disc being disposed between the flywheel and the pressure plate; the clutch disc comprising friction lining device for contacting the pressure plate and the flywheel during engagement of the clutch disc with the flywheel; device for hydraulically actuating the clutch disc; the hydraulic actuating device comprising: a cylinder, the cylinder having a first end and a second end and defining a chamber therein, at least a portion of the chamber comprising hydraulic fluid therein; a piston rod extending through the first end of the cylinder and into the chamber; a piston fastened to the piston rod; the piston being axially displaced in a guided manner within the cylinder; a device for providing hydraulic fluid into and out of the chamber; a first device for connecting the cylinder with the device for providing hydraulic fluid; a second device for connecting the cylinder to a portion of the motor vehicle; a device for damping pressure surges and vibrations; and the damping device being disposed on at least one of: the piston and the piston rod.

Another aspect of the present invention resides broadly in a cylinder in a motor vehicle, the cylinder for hydraulic systems for actuating at least one of: a clutch and a braking system; the cylinder comprising a piston rod; the cylinder further comprising a piston fastened to the piston rod; the piston being axially displaced in a guided manner within the cylinder; the cylinder having a first end and a second end and defining a chamber therein, at least a portion of the chamber comprising hydraulic fluid therein; a device for providing hydraulic fluid into and out of the chamber; a first device for connecting the cylinder with the device for providing hydraulic fluid; a second device for connecting the cylinder to a portion of the motor vehicle; a device for damping pressure surges and vibrations; and the damping device being disposed on at least one of: the piston and the piston rod.

Yet another aspect of the present invention resides broadly in a hydraulically operated clutch assembly for a motor vehicle, the clutch assembly comprising: a flywheel defining an axis of rotation and an axial direction parallel to the axis of rotation; a clutch disc; a pressure plate for applying an axially directed force to the clutch disc, with respect to the axis of rotation of the flywheel, to engage the clutch disc with the flywheel; the clutch disc being disposed between the flywheel and the pressure plate; the clutch disc comprising friction linings for contacting the pressure plate and the flywheel during engagement of the clutch disc with the flywheel; a device for hydraulically actuating the clutch disc; the hydraulic actuating device comprising: a cylinder, the cylinder having a first end and a second end and defining a chamber therein, at least a portion of the chamber comprising hydraulic fluid therein; a piston rod extending through the first end of the cylinder and into the chamber; a piston fastened to the piston rod; the piston being axially displaced in a guided manner within the cylinder; a device for providing hydraulic fluid into and out of the chamber; a first device for connecting the cylinder with the device for providing hydraulic fluid; a second device for connecting the cylinder to a portion of the motor vehicle; the piston comprising a pot shape; the piston having an inner, cylindrical surface; the inner, cylindrical surface of the piston being disposed to coaxially surround a substantial portion of the piston rod; the piston having an outer, cylindrical surface; the outer, cylindrical surface being disposed to coaxially surround the inner, cylindrical surface of the piston; the piston having an end portion, the end portion of the piston being disposed substantially adjacent the second end of the cylinder; the end portion together with the inner, cylindrical surface and the outer, cylindrical surface of the piston comprising the pot shape of the piston.

BRIEF DESCRIPTION OF THE DRAWINGS

The present invention is explained in greater detail below with reference to the accompanying drawings, in which:

FIG. 2a shows a hydraulic connection in cross section;

FIG. 2b shows an additional hydraulic connection in cross section;

FIG. 2c shows the same view as shown in FIG. 2 only with additional components;

FIG. 3a shows the same view as shown in FIG. 3 only with additional components;

DESCRIPTION OF THE PREFERRED EMBODIMENT

Figure 1:
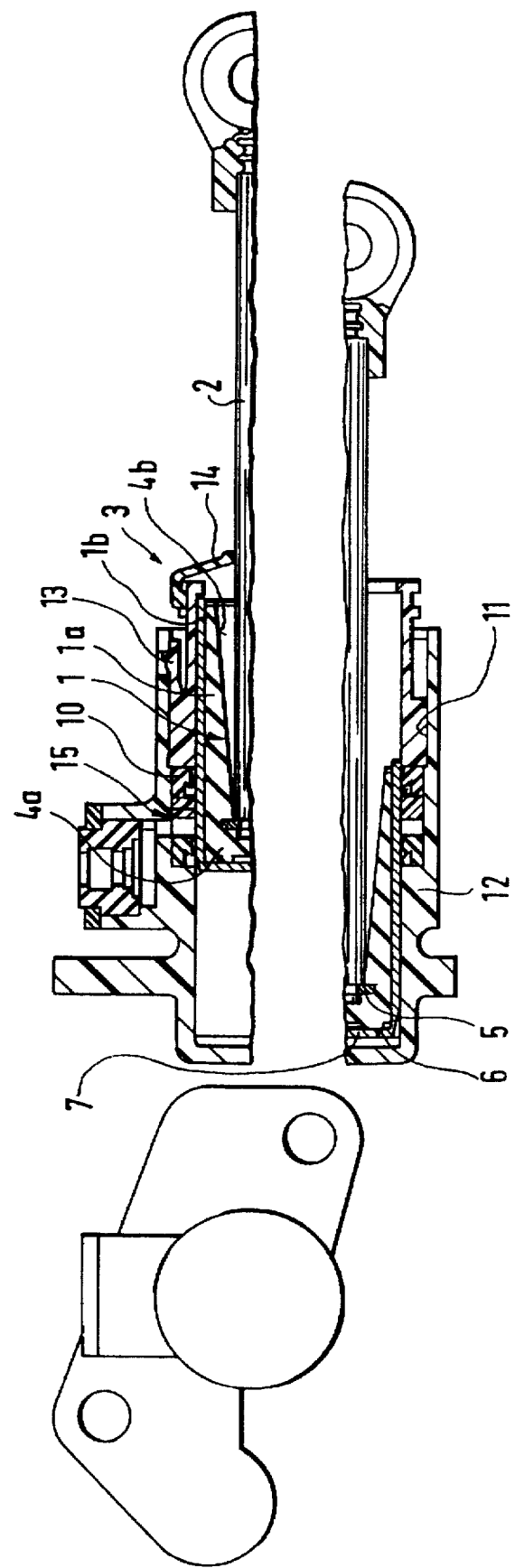
FIG. 1 shows a cylinder for a hydraulic system in cross section, whereby the cylinder in question is a master cylinder.

The cylinder illustrated in FIG. 1 can essentially include a housing 12 and a piston 1. The housing 12 can preferably be provided with a connection 15 for a pressure line. The housing 12 can, in accordance with one embodiment, be made of a suitable plastic.

The piston 1 can include an inner part 1a and a tube or outer part 1b, which tube or outer part 1b can surround the inner part 1a. The inner part 1a can thereby be fastened to a piston rod 2. The upper half of FIG. 1 shows the piston 1 in the extended position, and the lower half of FIG. 1 shows the piston 1 in the retracted position. In the housing 12, in a hole 11 essentially without any undercutting, there can be at least one lip seal 10, whereby the fixing element 13 can axially fix the lip seal 10. The fixing element 13 can simultaneously be locked to the housing 12 by means of locking lugs. The fixing or fastening element 13 can simultaneously carry a wiper ring 14, which wiper ring 14 can slide over the piston rod 2 to thereby essentially prevent dirt from entering.

The upper half of FIG. 1, therefore, can be considered to represent the piston rod 2 in an extended position, while the lower half of FIG. 1 can be considered to represent the piston rod 2 in a position farther inside of the cylinder. In accordance with one embodiment of the present invention, therefore, the outer part 1b of the piston 1 can surround the inner part 1a of the piston 1. The inner part 1a can thus be located adjacent and fastened to the piston rod 2. The hole 11 can preferably be designed in the housing 12 preferably without any undercutting. The lip seal 10 can be located within a portion of the hole 11 such that the fixing element 13 can secure the lip seal 10 axially within the cylinder. On the end of the fixing element 13, which end faces away from the lip seal 10, the fixing element 13 can include the wiper ring 14 to close off the cylinder. Furthermore, the cylinder can include a connection or pressure line 15 whereby hydraulic fluid can enter the cylinder to thereby pressurize the piston 1 and extend or retract the piston rod 2. In accordance with one embodiment, a passage for the flow of hydraulic fluid can be located in a wall of the cylinder adjacent the connection or pressure line 15.

The piston rod 2 can be connected to the piston 1 by means of a flexible fastening 5, so that a slight axial movement can be executed between the piston rod 2 and the piston 1. As an additional device to damp pressure surges or vibrations, the terminal area 3 of the piston 1 can be provided with an elastic suspension 4b, and/or the end similarly of the piston 1 can similarly be provided with an axial suspension 4a with respect to the base 7 of the outer part 1b of the piston 1. The elastic suspension 4a of the inner part 1a of the piston 1 can thereby include recesses or raised areas. If the piston 1 has a tubular outer part 1b made of metal and an inner part 1a made of elastic material, the recesses and raised areas of the axial suspension 4a can form a device for the damping of pressure surges or vibrations.

In accordance with one embodiment of the present invention, by means of the flexible fastening 5, therefore, the piston 1 can be connected with the piston rod 2. The flexible fastening 5 can thereby permit axial movement or play between the piston 1 and the piston rod 2. To provide additional damping capability, the terminal area or end 3 of the piston 1 can include the elastic suspension 4b, which elastic suspension 4b can essentially include a flexible material with damping characteristics. Similarly, the end surface 6 of the piston 1 can include the axial suspension 4a, which axial suspension 4a can also include a flexible material. In addition, the inner circumference of the axial suspension 4a can have recesses and raised areas to permit additional flexibility. By providing such flexibility, there can be additional means for damping pressure surges of the hydraulic fluid or vibrations, which pressure surges and vibrations could otherwise travel from the vehicle or vehicle engine to the actuator elements actuated by the operator.

Figure 2:
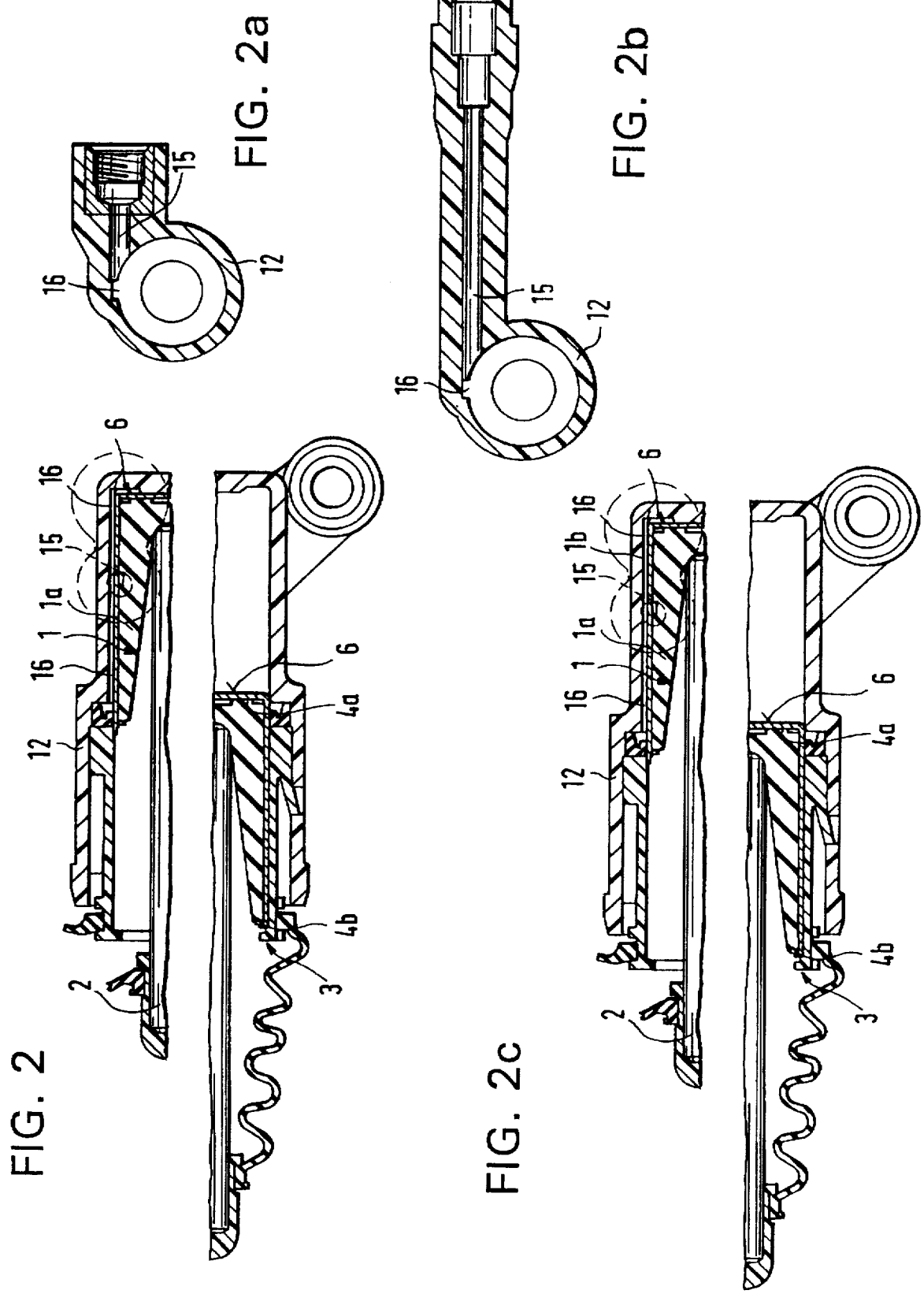
FIG. 2 shows an additional cylinder (slave cylinder) for hydraulic systems in cross section.

FIG. 2 illustrates an additional cylinder for hydraulic systems, whereby the housing 12 can be provided with a connection or pressure line 15, which pressure line 15 can be connected to a master cylinder as illustrated in FIG. 1. The piston 1 can again include an inner part 1a and a pot-shaped outer part 1b, see FIG. 2c, whereby channels 16 can run between the housing 12 and the pot-shaped outer part 1b in the axial direction. The channels 16 can provide a flow of hydraulic fluid to the end surface 6 of the piston 1. The piston rod 2 on a slave cylinder can be axially displaced by the pressurization of the end surface 6 of the piston 1, and the piston rod 2 can be used, for example, to actuate a clutch plate or brake system.

In summary, in accordance with one embodiment of the present invention, as shown in FIG. 2, the channels 16 can extend in an axial direction between the housing 12 and the pot-shaped outer part 1b whereby the channels 16 can permit hydraulic fluid to flow from the connection or pressure line 15 to the end surface 6 of the piston 1. The hydraulic fluid can thereby pressurize and axially displace the piston 1 into an extended position, as shown in the lower half of FIG. 2, whereby a clutch plate or a brake system can be actuated. Alternatively, the pressure line 15 can be located at another point, other than shown, with respect to the channels 16 and the end surface 6 of the piston 1. In addition, as shown in FIG. 2a, the connection or pressure line 15 can be located essentially adjacent to the cylinder. Or, alternatively, the connection or pressure line 15 can be located essentially remote from the cylinder, as shown in FIG. 2b.

The piston 1 illustrated in FIG. 2 is designed in two parts, whereby once again, between the inner part 1a and the outer part 1b, there can be an elastic, axial suspension 4a on the end surface 6 and an elastic suspension 4b on the terminal area 3 of the piston 1. In principle, however, the technical realization of the master cylinder illustrated in FIG. 1 is essentially the same as that of the slave cylinder illustrated in FIG. 2.

Figure 3:
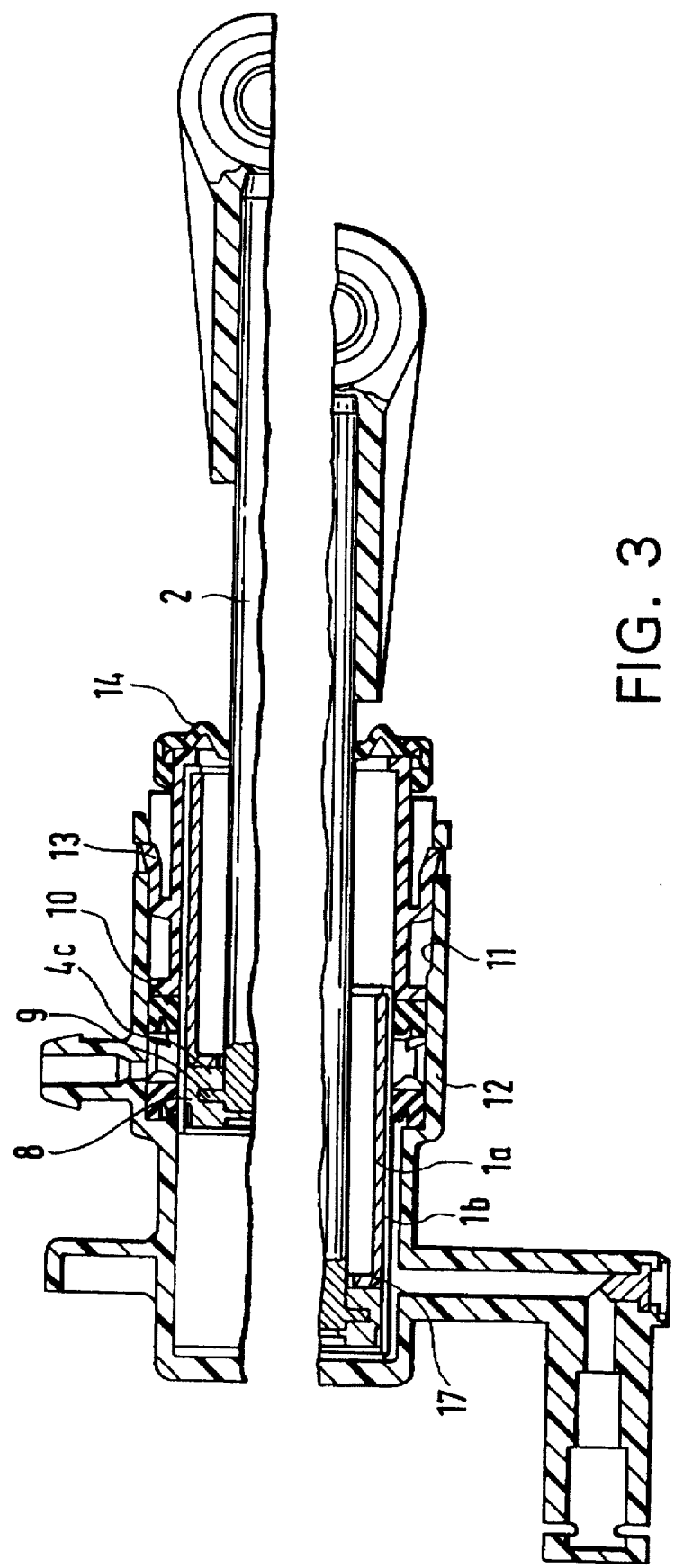
FIG. 3 shows an additional embodiment of a master cylinder in cross section.

FIG. 3 illustrates, in cross section, an additional embodiment of a master cylinder, whereby once again, at least one lip seal 10 can be located in the housing 12, which lip seal 10 can be held in the housing 12 by means of the fixing element 13. In this embodiment, too, the fixing element 13 can carry a wiper ring 14, which wiper ring 14 can seal the interior of the cylinder from the atmosphere. In this embodiment, the piston rod 2 can be provided with an extension 9, which extension 9 can extend radially outward. A cylindrical, elastic suspension 4c can be buttoned or fit on the extension 9. For this purpose, the elastic suspension 4c can be provided with an encircling recess 8, the cross section of which recess 8 can be essentially equal to the cross section of the extension 9 extending radially. The extension 9 can thereby include several individual extensions extending radially, which extensions can be distributed over the circumference of the piston rod 2. To fix the elastic suspension 4c, the piston 1, in accordance with this embodiment, can be provided with a pot-shaped outer part 1b and with an inner part 1a, whereby the inner part 1a, in the vicinity of the elastic suspension 4c, can have longitudinal segments 17, which longitudinal segments 17 can extend radially inward at least over a portion of the circumference.

In summary, in accordance with an embodiment of the present invention, as shown in FIG. 3, the piston rod 2 can have at least one extension 9, which extension 9 can extend radially outward. The extension 9 can include several, individual extensions radially extending outward and circumferentially spaced apart. Alternatively, the extension 9 can include a continuous extension encircling and radially extending from the circumference of the piston rod 2. By means of the recess 8, the cylindrical, elastic suspension 4c can be fastened about the extension 9 of the piston rod 2. The cross section of the recess 8 can, therefore, preferably be essentially equal to the cross section of the extension 9 of the piston rod 2. The cylindrical, elastic suspension 4c can be made of a flexible material to thereby permit a damping capability with respect to the piston rod 2. For the purpose of securely fastening the cylindrical, elastic suspension 4c, the inner part 1a can have longitudinal segments 17, a portion of which longitudinal segments 17 can extend radially inward to thereby abut the cylindrical, elastic suspension 4c. Furthermore, as shown in FIG. 3a, the cylinder can have a pressure line 15a. By means of channels 16a, hydraulic fluid can flow from the pressure line 15a to the end surface 6 of the piston 1. The hydraulic fluid can thereby pressurize and axially displace the piston rod 2.

Figure 4:
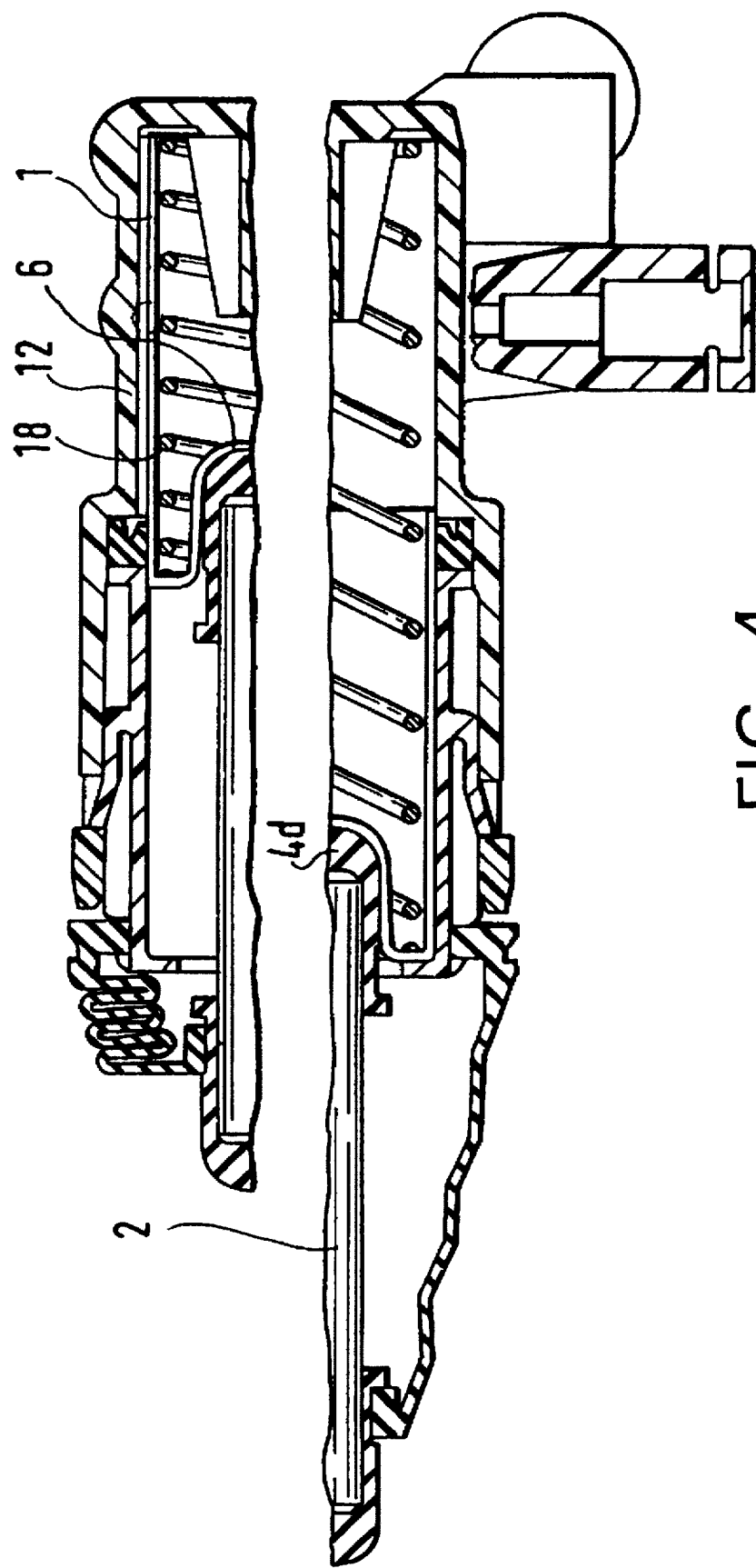
FIG. 4 shows a slave cylinder in cross section.

FIG. 4 shows one embodiment of a slave cylinder in which the piston 1 can be located in the housing 12, whereby an elastic suspension 4d can be located between the end surface of the piston rod 2 and the end surface 6 of the piston 1. This elastic suspension 4d can be inherently flexible, with a flexibility which can be achieved by an appropriate choice of material. In this embodiment, the piston 1 can be held in engagement with the piston rod 2 by means of a spring 18. Otherwise, this embodiment is essentially the same as the realization of the slave cylinder illustrated in FIG. 2.

Figure 4A:
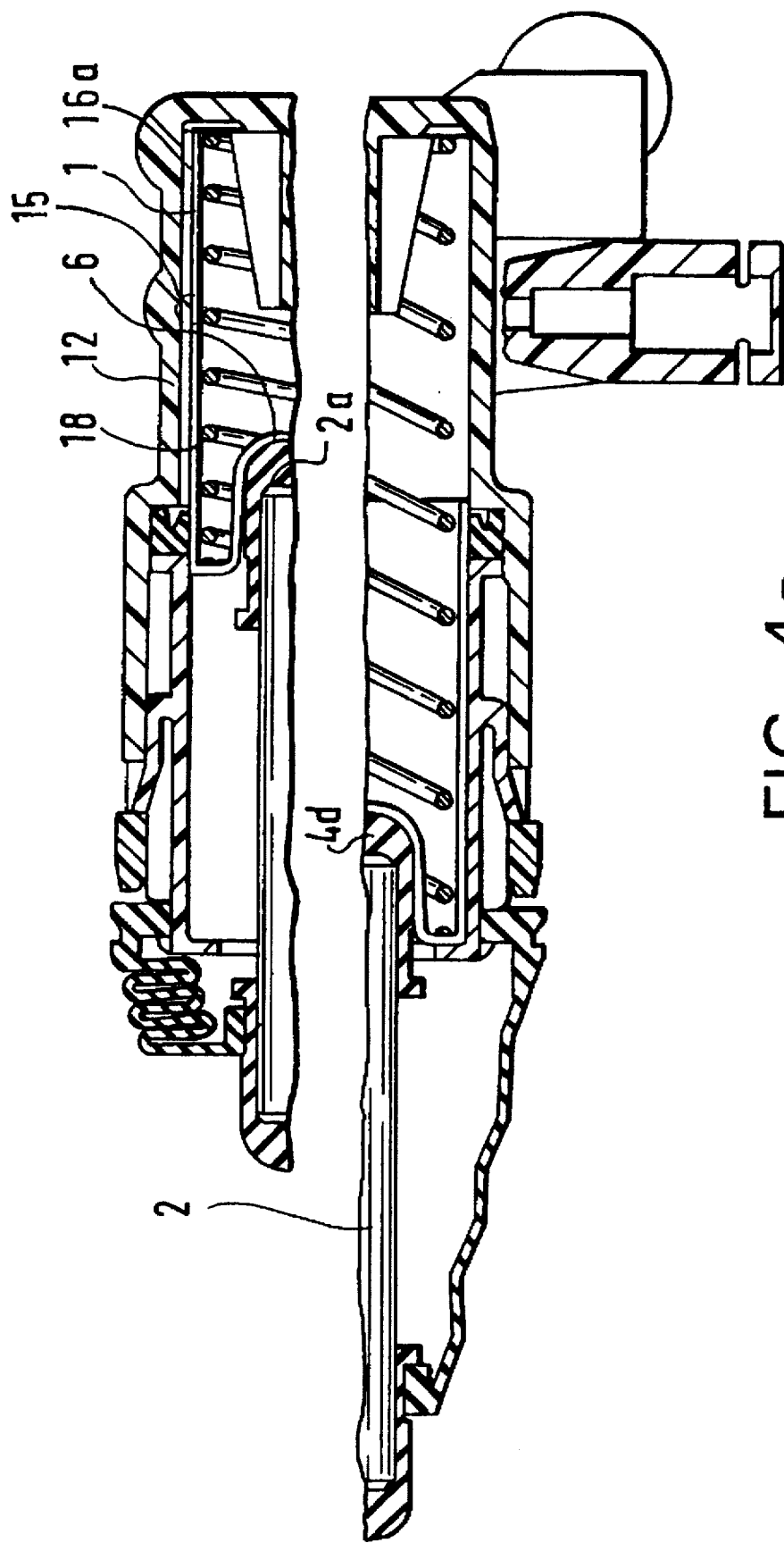
FIG. 4a shows the same view as shown in FIG. 4 only with additional components.

In accordance with one embodiment of the present invention, therefore, as shown in FIGS. 4 and 4a, the elastic suspension 4d can be located between, and can be in contact with, an end surface 2a of the piston rod 2 and the end surface 6 of the piston 1. The elastic suspension 4d can preferably include a flexible material to permit additional damping of vibrations or pressure surges. For the purpose of securing the piston 1 and the piston rod 2 together, the spring 18 can prestress the end surface 6 of the piston 1 against the end surface 2a of the piston rod 2. Furthermore, by means of the connection or pressure line 15, hydraulic fluid can flow by means of the channels 16a to thereby retract or extend the piston rod 2.

Figure 5:
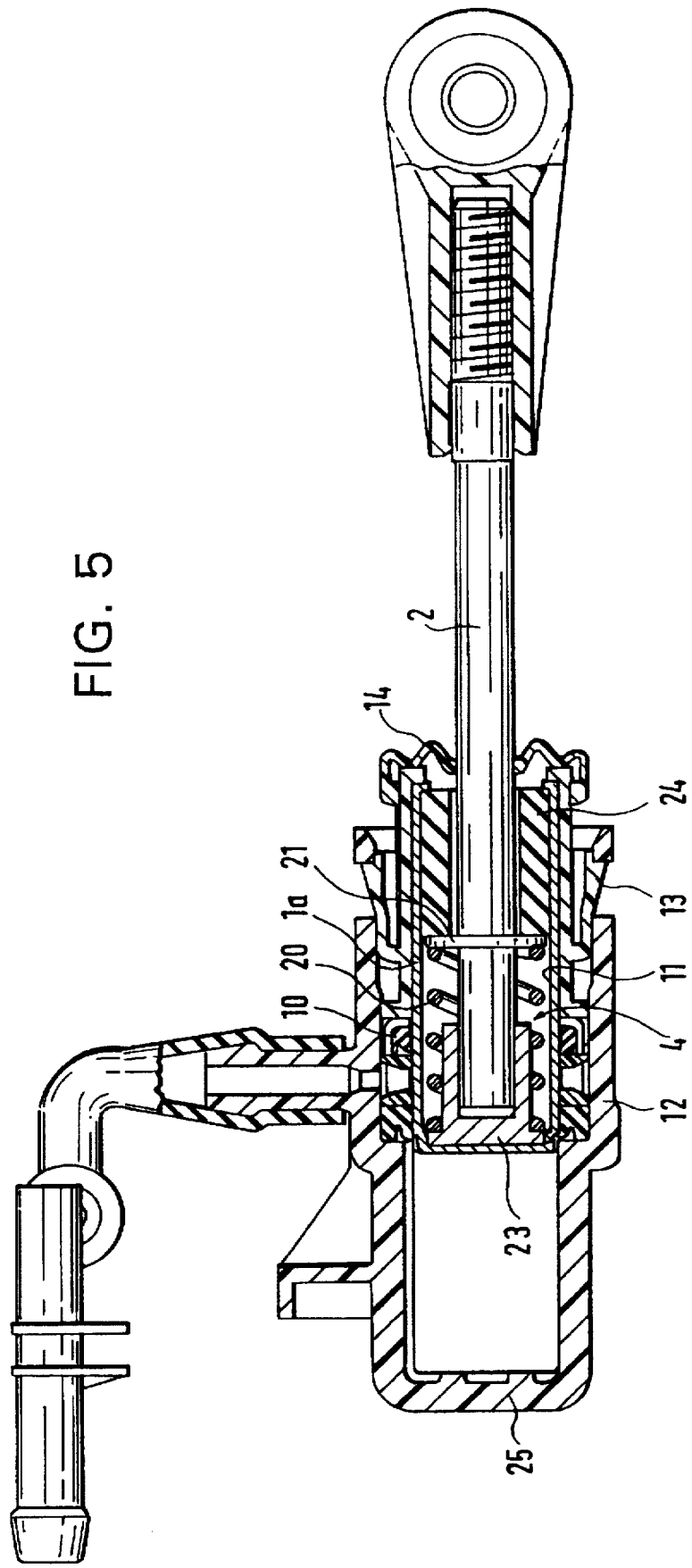
FIG. 5 shows an additional embodiment of the master cylinder in cross section.

The master cylinder illustrated in FIG. 5 is essentially the same as the one illustrated in FIG. 3, so that at this point, all that needs to be discussed are the structural differences relating primarily to the connection of the piston rod 2 to the piston 1 by means of a spring 20, which spring 20 can be the elastic element 4. The spring 20 can be supported on one end on a radially projecting ring 21 of the piston rod 2, and on the other end on a bushing 23, which bushing 23 can surround the piston rod 2. For its part, the bushing 23 can come into contact with the inner part 1a of the piston rod 2. In addition, the bushing 23 can preferably be elastic.

Figure 5A:
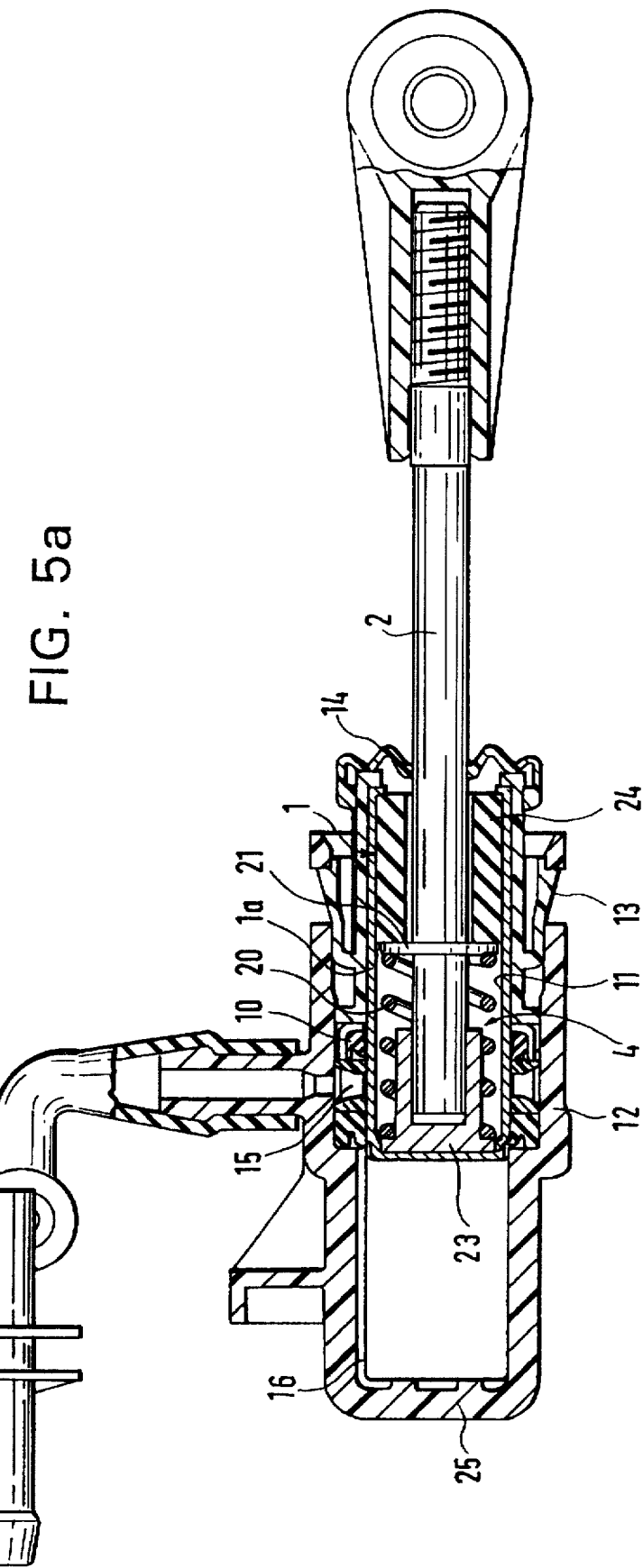
FIG. 5a shows the same view as shown in FIG. 5 only with additional components.

In accordance with one embodiment, as shown in FIG. 5, the spring 20 can serve a dual function. The spring 20 can connect the piston 1 and the piston rod 2 together, and the spring 20 can also provide additional damping due to the flexibility of the spring 20. The piston rod 2 can include the radially projecting ring 21, against which radially projecting ring 21 one end of the spring 20 can be supported. The other end of the spring 20 can be supported against a portion of the bushing 23, which bushing 23 can surround the end portion of the piston rod 2. As shown in FIG. 5a, a pressure line 15 can provide hydraulic fluid to channels 16 to pressurize and thereby retract or extend the piston rod 2 with respect to the cylinder. Alternatively, a molded or cast passage can be located within the cylinder wall to permit fluid to flow to the chamber between the wiper ring 14 and the adjacent end of the piston rod 2, as shown in FIG. 5.

The radially projecting ring 21 can be in contact, with its side farther from the spring 20, with an elastic damping element 24, which elastic damping element 24 can be supported on the inner part 1a of the piston 1, on the opposite end from the bushing 23.

In accordance with one embodiment of the present invention, since the spring 20, the bushing 23, and the elastic damping element 24, as shown in FIG. 5, can each provide flexibility, this embodiment can provide a substantial damping of pressure surges or vibrations.

The cylinder can preferably function as follows: When a pressure force is exerted on the piston rod 2, the inner part 1a can be inserted into the housing 12 of the cylinder. And when the inner part 1a comes into contact with a stop in a specified position, e.g. on a housing base 25, the spring 20 can, by deformation, perform an elastic damping of the pressure movement of the piston rod 2. Conversely, when a decompression force is exerted on the piston rod 2, the decompression force can be transmitted with essentially only a small elastic deformation via the damping element 24 to the inner part 1a. The piston rod 2 can thereby be pulled almost immediately toward the end of the inner part 1a, and thus of the housing 12, corresponding to this direction of movement. On account of the use of the spring 20, the elasticity between the inner part 1a and the piston rod 2 can accordingly, to a significant extent, be a function of the respective direction of action.

In summary, in accordance with one embodiment of the present invention, as shown in FIG. 5, when the hydraulic fluid flows from the pressure line 15, the hydraulic fluid can exert pressure on the piston rod 2, whereby the inner part 1a of the piston 1 can be inserted into the housing 12 of the cylinder. When the piston 1 subsequently contacts the base 25, the spring characteristics of the spring 20 can damp the compression of the piston rod 2. The damping characteristics provided by the spring 20 can be substantially greater than the elasticity and damping characteristics of the elastic element 24. Thus, when the hydraulic fluid exerts pressure on the piston rod 2 in the decompression direction, the elastic element 24 can permit an essentially immediate decompression of the piston rod 2 toward the end of the housing 12 opposite the base 25. By means of the spring 20, therefore, the damping capability between the piston 1 and the piston rod 2 can be a function of either of the compression or the decompression of the piston rod 2.

Figure 6:
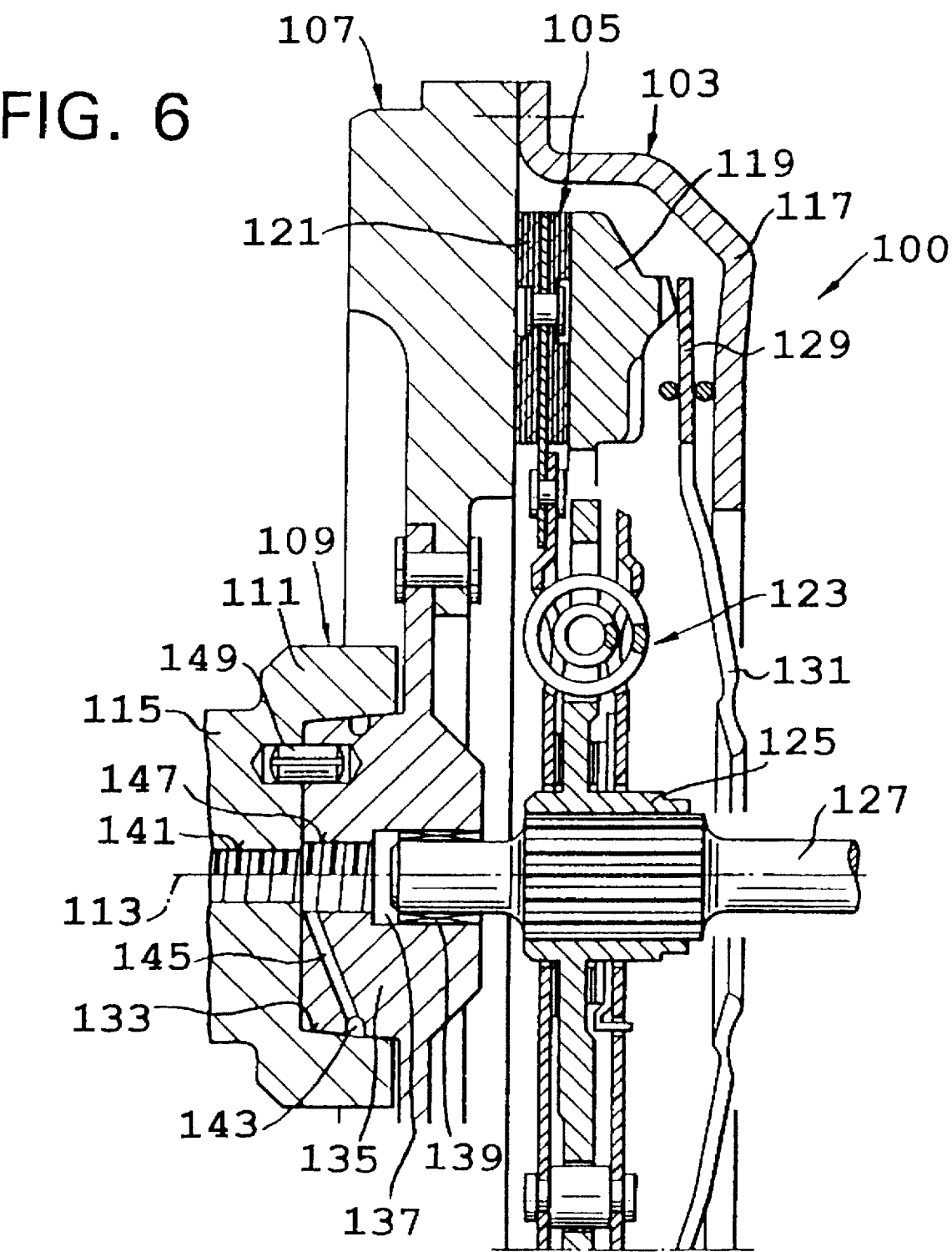
FIG. 6 shows a partial axial longitudinal section through a clutch assembly fastened to a crankshaft of an engine of a motor vehicle.

FIG. 6 shows a motor vehicle friction clutch 101 with which the present invention could be utilized. It should be understood that the components found hereinbelow can be considered as being interchangeable with any similar components discussed hereinabove. The friction clutch 101 shown in FIG. 6 can generally include a pressure plate unit, designated 103 in general, a clutch disc 105 and a flywheel 107. The friction clutch 101 can preferably be mounted by means of a fastening system 109, preferably on the output end 111 of a crankshaft 115, which crankshaft 115 can rotate around an axis of rotation 113 on an internal combustion engine (not shown) of the motor vehicle.

The pressure plate unit 103, in a manner which is well known in the art, can have a clutch housing 117 which clutch housing 117 can be fixed to the flywheel 107, for example by welding, so that the clutch housing 117 can be detached, but preferably does not detach during operation. An essentially disc-shaped application plate or pressure plate 119 can be mounted on the clutch housing 117. The application plate 119 can be mounted by means of tangential leaf springs, for example, which tangential leaf springs are not illustrated in any additional detail, but which tangential leaf springs may be disclosed in U.S. Pat. No. 4,757,597 to Kohler on Jul. 19, 1988, entitled "Method of Assembling a Friction Clutch", and U.S. Pat. No. 4,640,398 to Kolb et al. on Feb. 3, 1987, entitled "Friction Clutch with Tangential Leaf Springs". The application plate 119 can be mounted by means of tangential leaf springs so that the application plate 119 essentially does not rotate, but can preferably move axially.

Preferably between the application plate 119 and the flywheel 107, there can be friction linings 121 of the clutch disc 105, which friction linings 121 can be connected to a hub 125 of the clutch disc 105 in a manner well known in the art, such as by means of a torsional vibration damper 123, preferably in a rotationally elastic manner. The clutch disc 105 can be guided preferably by means of the hub 125 in an essentially non-rotating, but axially movable manner on an input shaft 127 of a transmission. The input shaft 127 can preferably be disposed downstream of the friction clutch 101 in the torque transmission path. A membrane spring 129, preferably held in the clutch housing 117, can apply pressure to the application plate 119, and the friction lining 121 can hold the application plate 119 in a friction-tight manner preferably against the flywheel 107. A disconnecting lever (not shown here), can act on the flexible tongues 131 preferably of the membrane spring 129, whereby the load on the application plate 119 can be relieved and the clutch 101 can be disconnected or disengaged. In accordance with one embodiment, if the present invention is utilized as a slave cylinder, the slave cylinder (not shown here) can preferably be operatively attached, by means of a piston rod, to the throwout lever, the throwout lever then causing the membrane spring 129 to release the load on the application plate 119. Additional types of disconnecting or disengaging levers may be disclosed in U.S. Pat. No. 4,751,990 to Schraut et al. on Jun. 21, 1988, entitled "Multi-disc Clutch Unit, Particularly for Heavy Duty Motor Vehicles", and U.S. Pat. No. 4,238,018 to Maucher on Dec. 9, 1980, entitled "Disengaging Unit for Drawing Disengagable Friction Clutches".

The output end 111 of the crankshaft can preferably contain a central opening 133 in the face of the crankshaft 115, the inner jacket or surface of which opening 133 can form a taper surface which can taper axially into the crankshaft 115. A conical extension 135 which can project axially from the flywheel 107, can extend into the opening 133 in the end of the crankshaft 115, and the outer jacket of the conical extension 135 can have a taper surface which can essentially match the inner jacket of the opening 133 in the face of the crankshaft 115. The matching taper surfaces of the opening 133 and of the conical extension 135 can form the essentially axial joint surfaces of a radial interference fit, which can radially guide the flywheel 107 on the crankshaft 115, and can transmit the torque from the crankshaft 115 to the clutch 101.

The conical extension 135 can form a hub of the flywheel 107 and can contain a progressively stepped hole 137, which stepped hole 137 can expand radially toward the clutch disc 105. The stepped hole 137, preferably in its expanded portion, can house a pilot bearing 139, preferably for the radial guidance of the crankshaft-side end 115 of the transmission input shaft 127. The face or central opening 133 can continue or extend along the same axis as the stepped hole 137, preferably into a threaded hole 141, into which threaded hole 141 a clamping bolt (not shown) can be screwed through the hub 125, preferably for the assembly of the friction clutch 101, before the insertion of the transmission input shaft 127 into the hub 125. By means of the clamping bolt, which is not illustrated in any further detail and should be removed following assembly, the conical extension 135 can be axially pressed into the opening 133 in the end of the crankshaft 115.

The flywheel 107 can preferably be removed from the crankshaft 115 by means of hydraulically actuated extraction devices, which can preferably act by means of rod-sleeve connections through the hub 125 of the clutch disc 105 to the connection area 109. The conical extension 135 can be provided with threaded connections, for example, in the vicinity of its graduated or stepped hole 137. The extraction of the flywheel 107 from the output end 111 can also possibly be done by hydraulic expansion of the output end 111. For this purpose, there can preferably be a ring-shaped groove 143 on the circumference of the conical extension 135, which ring-shaped groove 143 can be connected by means of one or more radial channels 145, to a central pressure medium connection, e.g. designed as a threaded hole 147. The threaded hole 147 may form a part of the stepped hole 137. The pressure medium connection 147 can preferably be connected through the hub 125 of the clutch disc 105 to a hydraulic pressure unit (not shown), which hydraulic pressure unit can hydraulically expand the opening 133 in the end of the crankshaft 115, preferably by means of the closed circular line or groove 143.

The flywheel 107 can be connected relative to the crankshaft 115 by means of an indexing pin 149, which indexing pin 149 can define the angular position of the flywheel 107 relative to the crankshaft 115.

It should be understood that the friction clutch 101 shown in FIG. 6 is presented only by way of example of one type of clutch in which the present invention may be incorporated.

One feature of the invention resides broadly in the cylinder for hydraulic systems, in particular for motor vehicles, including a housing with an axial boring, in which a piston fastened to a piston rod is displaced axially in a guided manner, whereby one end surface of the piston is pressurized with hydraulic fluid, and whereby the piston is guided in a sealed manner with respect to the housing, whereby the cylinder is provided with connections for at least one pressure line, a connection to a fluid chamber and for fastening, and that at least one lip seal located in the housing seals the housing with respect to the exterior surface of the piston, characterized by the fact that the piston 1 and/or the piston rod 2, between the hydraulic fluid and the terminal area 3 of the piston rod 2 farther from the piston 1, is provided with a device to damp pressure surges from the hydraulic fluid.

Another feature of the invention resides broadly in the cylinder characterized by the fact that the device includes an elastic suspension 4 which is located between the piston rod 2 and the piston 1.

Yet another feature of the invention resides broadly in the cylinder characterized by the fact that the elastic suspension 4 is formed by a spring 20 which acts between the piston rod 2 and the piston 1.

Still another feature of the invention resides broadly in the cylinder characterized by the fact that as the device, a flexible fastening 5 is provided between the piston 1 and the piston rod 2.

A further feature of the invention resides broadly in the cylinder characterized by the fact that when a piston 1 is used which includes an inner part 1a and an outer part 1b, the device is located between the inner part 1a and the outer part 1b.

Another feature of the invention resides broadly in the cylinder characterized by the fact that the piston 1 includes a pot-shaped outer part 1b and an inner part 1a, and at least one end surface 6 of the inner part 1a and/or the bottom 7 of the pot-shaped outer part 1b are provided with raised areas and/or depressions.

Yet another feature of the invention resides broadly in the cylinder characterized by the fact that the raised areas are made of elastically deformable material.

Still another feature of the invention resides broadly in the cylinder characterized by the fact that a pot-shaped piston 1 is provided in its terminal area with a ring-shaped elastic suspension 4 provided with recesses 8, whereby a corresponding extension 9 of the piston rod 2 guarantees that it can button into the recesses 8.

A further feature of the invention resides broadly in the cylinder characterized by the fact that at least one lip seal 10 is located in an axial hole 11 with no undercutting of the housing 12, and is axially supported by means of a fixing element 13 which can be locked to the housing 12.

Another feature of the invention resides broadly in the cylinder characterized by the fact that the fixing element 13 carries a wiper ring 14 which is engaged with the piston rod 2.

Yet another feature of the invention resides broadly in the cylinder characterized by the fact that the pressure connection is located at some distance from the bottom of the cylinder, and is connected to the latter by means of a groove which runs radially between the piston 1 and the interior of the cylinder, whereby the cross section of the groove, together with the distance between the pressure connection and the bottom of the cylinder, achieves a defined hydraulic damping.

Still another feature of the invention resides broadly in the cylinder for hydraulic systems, in particular for motor vehicles, consisting of a housing with an axial boring, in which a piston fastened to a piston rod is displaced axially in a guided manner, whereby one end surface of the piston is pressurized with hydraulic fluid, and whereby the piston is guided in a sealed manner with respect to the housing, whereby the cylinder is provided with connections for at least one pressure line, a connection to a fluid chamber and for fastening, and that at least one lip seal located in the housing seals the housing with respect to the exterior surface of the piston, characterized by the fact that the piston 1 is realized in a pot shape.

Some examples of clutch assemblies and various components associated therewith which could possibly utilize the present invention may be disclosed in the following U.S. Pat. No. 4,684,007 to Maucher, entitled "Clutch Plate"; U.S. Pat. No. 4,635,780 to Wiggen, entitled "Clutch Disc for a Motor Vehicle Friction Clutch"; U.S. Pat. No. 4,651,857 to Schraut et al., entitled "Clutch Disc Unit for a Motor Vehicle Friction Clutch"; U.S. Pat. No. 5,103,688 to Kuhne, entitled "Two-mass Flywheel"; and U.S. Pat. No. 4,777,843 to Bopp, entitled "Two-mass Flywheel Assembly With Viscous Damping Assembly".

Some examples of hydraulic clutch systems which could possibly utilize the piston-cylinder arrangement of the present invention are disclosed by the following U.S. Patents, each of which is assigned to the assignee of the present invention: U.S. Pat. No. 5,211,099 to Grosspietsch et al., dated May 18, 1993 and entitled "Slave Cylinder for a Hydraulic Actuating System of a Motor Vehicle Friction Clutch"; U.S. Pat. No. 5,052,279 to Limbacher and Fadler, dated Oct. 1, 1991 and entitled "Hydraulic Cylinder for a Hydraulic Actuation Arrangement of a Motor Vehicle Friction Clutch"; and U.S. Pat. No. 4,456,111 to Limbacher, dated Jun. 26, 1984 and entitled "Hydraulic Control System for a Clutch".

Some additional examples of hydraulic and/or pneumatic devices which can possibly utilize the piston-cylinder arrangement of the present invention are disclosed by the following U.S. Pat. No. 5,092,125 to Leight et al., entitled "Seal"; U.S. Pat. No. 4,635,778 to Lederman, entitled "Fluid-Operated Piston"; U.S. Pat. No. 4,960,188 to Wossner, entitled "Single-Tube Vibration Damper of Variable Damping Force"; U.S. Pat. No. 5,064,030 to Wossner, entitled "Impact Damping Unit"; U.S. Pat. No. 4,599,860 to Parsons, entitled "Liquid Pressure Apparatus"; and U.S. Pat. No. 2,317,601 to Fowler on Mar. 7, 1940, entitled "Pressure Braking System".

Hydraulic braking systems which could also possibly utilize the present invention may be disclosed in the following U.S. Pat. No. 4,634,190 to Wupper, entitled "Hydraulic Brake System With Slip Control"; U.S. Pat. No. 4,643,488 to Reinartz, entitled "Hydraulic Vehicle Servo Brake"; U.S. Pat. No. 4,643,489 to Reinartz et al., entitled "Hydraulic Brake System With Slip Control"; U.S. Pat. No. 4,656,833 to Belart, entitled "Hydraulic Brake System for Automotive Vehicles"; and U.S. Pat. No. 4,902,077 to Belart et al., entitled "Hydraulic Brake System".

Types of impact dampers for bumpers which could possibly utilize the present invention may be disclosed in the following U.S. Pat. No. 4,809,924 to Martens et al., entitled "Hydraulic Bumper"; U.S. Pat. No. 5,096,242 to Chin-Hun, entitled "Shock Absorbing Bumper System"; and U.S. Pat. No. 5,277,462 to Verzelli et al., entitled "High-performance Car Bumper Module".

Types of strut assemblies which could possibly utilize the present invention may be disclosed in the following U.S. Pat. No. 4,828,237 to Neff, entitled "Reduced Length MacPherson Strut"; and U.S. Pat. No. 4,861,066 to Derhie, entitled "Vehicle Suspension Strut Systems".

Some examples of elastically deformable material which may be utilized in accordance with embodiments of the present invention may be found in the following U.S. Pat. No. 5,104,131 entitled "Arrangement for Sealing a Reciprocating Rod" to Busak & Luyken; U.S. Pat. No. 4,981,303 entitled "Sealing Device" to NOK; U.S. Pat. No. 5,156,371 entitled "Triaxially-equallized Action Shock Mount" to Digital Equipment; U.S. Pat. No. 5,269,536 entitled "Sealing Device" to NOK; U.S. Pat. No. 5,373,670 entitled "Shakeproof Bearing" to Sumitomo, Gomu, Kogyo, Kabushiki and Kaisha; and U.S. Pat. No. 5,355,775 entitled "Pressure-transmitting Hydraulic Cylinder".

An additional example of a hydraulic and/or pneumatic device which can be utilized in accordance with embodiments of the present invention is disclosed by the Federal Republic of Germany Patent Application DE 42 12 107 A1.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, are hereby incorporated by reference as if set forth in their entirety herein.

The corresponding foreign patent publication applications, namely, Federal Republic of Germany Patent Application No. P 44 41 438.2, filed on Nov. 23, 1994 and P 195 16 391.5, filed on May 4, 1995, having inventors Wolfgang Grosspietsch and Alfred Eusemann, and DE-OS P 44 41 438.2 and P 195 16 391.5 and DE-PS P 44 41 438.2 and P 195 16 391.5, are hereby incorporated by reference as if set forth in their entirety herein.

The invention as described hereinabove in the context of the preferred embodiments is not to be taken as limited to all of the provided details thereof, since modifications and variations thereof may be made without departing from the spirit and scope of the invention.

What is claimed is:

1. A hydraulically operated clutch assembly for a motor vehicle, said clutch assembly comprising:

a flywheel defining an axis of rotation and an axial direction parallel to the axis of rotation;

a clutch disc;

a pressure plate for applying an axially directed force to said clutch disc, with respect to said axis of rotation of said flywheel, to engage said clutch disc with said flywheel;

said clutch disc being disposed between said flywheel and said pressure plate;

said clutch disc comprising friction lining means for contacting said pressure plate and said flywheel during engagement of said clutch disc with said flywheel;

means for hydraulically actuating said clutch disc;

said hydraulic actuating means comprising:

a cylinder, said cylinder having a first end and a second end and defining a chamber therein, at least a portion of said chamber comprising hydraulic fluid therein;

a piston rod extending through said first end of said cylinder and into said chamber;

a piston fastened to said piston rod;

said piston being axially displaced in a guided manner within said cylinder;

means for providing hydraulic fluid into and out of said chamber;

first means for connecting said cylinder with said means for providing hydraulic fluid;

second means for connecting said cylinder to a portion of said motor vehicle;

said piston comprising a hollow cylindrical-shaped outer part;

said outer part being closed at one end;

said piston comprises an inner part;

said inner part comprising an end surface; and at least one of: said end surface of the inner part, and said closed end of said outer part comprising at least one of:
 raised areas; and
 depressions; and
 said raised areas comprising elastically deformable material.

2. A hydraulically operated clutch assembly for a motor vehicle, said clutch assembly comprising:

a flywheel defining an axis of rotation and an axial direction parallel to the axis of rotation;

a clutch disc;

a pressure plate for applying an axially directed force to said clutch disc, with respect to said axis of rotation of said flywheel, to engage said clutch disc with said flywheel;

said clutch disc being disposed between said flywheel and said pressure plate;

said clutch disc comprising friction lining means for contacting said pressure plate and said flywheel during engagement of said clutch disc with said flywheel;

a mechanism for hydraulically actuating said clutch disc;

said hydraulic actuating mechanism comprising:

a cylinder, said cylinder having a first end and a second end and defining a chamber therein, at least a portion of said chamber comprising hydraulic fluid therein;

a piston rod extending through said first end of said cylinder and into said chamber;

a piston fastened to said piston rod;

said piston being axially displaced in a guided manner within said cylinder;

means for providing hydraulic fluid into and out of said chamber;

first means for connecting said cylinder with said means for providing hydraulic fluid;

second means for connecting said cylinder to a portion of said motor vehicle;

a ring-shaped elastic suspension being disposed between the piston rod and the piston;

said piston comprising a hollow cylindrical-shaped piston;

said piston being closed at one end;

said cylindrical-shaped piston having a first end portion;

said ring-shaped elastic suspension being disposed in said first end portion;

said ring-shaped elastic suspension comprising recesses;

an end portion of said piston rod comprising an extension; and means for fastening said extension of said piston rod to said recesses of said ring-shaped elastic suspension.

3. A hydraulically operated clutch assembly for a motor vehicle, said clutch assembly comprising:

a flywheel defining an axis of rotation and an axial direction parallel to the axis of rotation;

a clutch disc;

a pressure plate for applying an axially directed force to said clutch disc, with respect to said axis of rotation of said flywheel, to engage said clutch disc with said flywheel;

said clutch disc being disposed between said flywheel and said pressure plate;

said clutch disc comprising friction lining means for contacting said pressure plate and said flywheel during engagement of said clutch disc with said flywheel;

a mechanism to hydraulically actuate said clutch disc;

said hydraulic actuating mechanism comprising:

a cylinder, said cylinder having a first end and a second end and defining a chamber therein, at least a portion of said chamber comprising hydraulic fluid therein;

piston rod means extending through said first end of said cylinder and into said chamber;

a piston fastened to said piston rod means;

said piston being axially displaced in a guided manner within said cylinder;

means for providing hydraulic fluid into and out of said chamber;

first means for connecting said cylinder with said means for providing hydraulic fluid;

second means for connecting said cylinder to a portion of said motor vehicle;

means for damping pressure surges and vibrations; and said damping means being disposed on at least one of: said piston and said piston rod means;

said piston has an inner portion and an outer portion;

at least one lip seal being disposed in said housing to seal said housing with respect to said outer portion of said piston;

said at least one lip seal being disposed in an axial hole with no undercutting of the housing; and said at least one lip seal being axially supported by means of a fixing element locked to the housing;

said fixing element carrying a wiper ring which is engaged with the piston rod means.

4. In a motor vehicle, a cylinder for hydraulic systems for actuating at least one of: a clutch and a braking system;

said cylinder comprising piston rod means; the cylinder further comprising a piston fastened to said piston rod means; the piston being axially displaced in a guided manner within the cylinder;

said cylinder having a first end and a second end and defining a chamber therein, at least a portion of said chamber comprising hydraulic fluid therein;

means for providing hydraulic fluid into and out of said chamber;

first means for connecting said cylinder with said means for providing hydraulic fluid;

second means for connecting said cylinder to a portion of said motor vehicle;

said piston comprising a hollow cylindrical-shaped outer part;

said outer part being closed at one end;

said piston comprises an inner part;

said inner part comprises an end surface; and at least one of: said end surface of the inner part, and said closed end of the outer part comprising at least one of:
- raised areas; and
- depressions;

said raised areas comprising elastically deformable material;

said piston having a first end;

said first end comprising a ring-shaped elastic suspension;

said ring-shaped elastic suspension comprising recesses;

an end portion of said piston rod comprising an extension;

means for fastening said extension of said piston rod to said recesses of said ring-shaped elastic suspension;

said piston having an inner portion and an outer portion;

at least one lip seal being disposed in said housing to seal said housing with respect to said outer portion of said piston;

said at least one lip seal being disposed in an axial hole with no undercutting of the housing;

said at least one lip seal being axially supported by means of a fixing element locked to the housing;

said fixing element carrying a wiper ring which is engaged with the piston rod means;

the pressure connection being located at some distance from the bottom of the cylinder; and the pressure connection being connected to the cylinder by means of a groove which runs radially between the piston and the interior of the cylinder, whereby the cross section of the groove, together with the distance between the pressure connection and the bottom of the cylinder, achieves a defined hydraulic damping.

* * * * *

UNITED STATES PATENT AND TRADEMARK OFFICE
CERTIFICATE OF CORRECTION

PATENT NO. : 5,704,462
DATED : January 6, 1998
INVENTOR(S) : Wolfgang GROSSPIETSCH and Alfred EUSEMANN It is certified that error appears in the above-identified patent and that said Letters Patent is hereby corrected as shown below:

In column 5, line 1, before 'of', delete "similarly" and insert --surface 6--.

In column 11, line 64, after 'to', delete "Derhie," and insert --Dernie,--.

Signed and Sealed this

Twenty-sixth Day of May, 1998

Attest:

BRUCE LEHMAN

Attesting Officer

Commissioner of Patents and Trademarks